(12) United States Patent
Dautais et al.

(10) Patent No.: US 7,790,035 B2
(45) Date of Patent: Sep. 7, 2010

(54) TERTIARY SYSTEM AND PROCESS FOR TREATING A LIQUID EFFLUENT FROM AN ONSITE DOMESTIC SECONDARY TREATMENT UNIT

(75) Inventors: Jean-Pierre Dautais, Basse Goulaine (FR); Roger Lacasse, Notre-Dame du Portage (CA); Denis Pettigrew, Notre-Dame du Portage (CA); Pierre Talbot, Notre-Dame du Portage (CA)

(73) Assignee: Premier Tech Technologies LTEE, Riviere-du-Loup, Quebec (CA)

( * ) Notice: Subject to any disclaimer, the term of this patent is extended or adjusted under 35 U.S.C. 154(b) by 0 days.

(21) Appl. No.: 12/048,104

(22) Filed: Mar. 13, 2008

(65) Prior Publication Data
US 2009/0230057 A1 Sep. 17, 2009

(51) Int. Cl.
C02F 3/06 (2006.01)
(52) U.S. Cl. ................ 210/617; 210/747; 210/151; 210/170.08
(58) Field of Classification Search ............ 210/602, 210/617, 747, 150, 151, 170.08
See application file for complete search history.

(56) References Cited

U.S. PATENT DOCUMENTS

| | | | |
|---|---|---|---|
| 1,950,841 A * | 3/1934 | Crawford | 210/150 |
| 3,770,623 A * | 11/1973 | Seidel | 210/170.08 |
| 4,218,318 A * | 8/1980 | Niimi et al. | 210/150 |
| 4,839,051 A * | 6/1989 | Higa | 210/747 |
| 4,855,040 A * | 8/1989 | Kickuth | 210/150 |
| 4,995,969 A * | 2/1991 | LaVigne | 210/150 |
| 5,618,414 A | 4/1997 | Goupil et al. | |
| 5,637,218 A * | 6/1997 | Kickuth | 210/170.08 |
| 6,428,691 B1 * | 8/2002 | Wofford | 210/151 |
| 6,602,407 B2 | 8/2003 | Talbot et al. | |
| 2003/0024874 A1 | 2/2003 | Wallace et al. | |

(Continued)

FOREIGN PATENT DOCUMENTS

FR 2644773 A2 9/1990

(Continued)

OTHER PUBLICATIONS

Le Roseau (and courtesy translation), Tertiaire Classe V avec massif (bac) filtrant de désinfection autonome No. RE-1440/DI/ 4 chambres à coucher, Blainville, Quebec, Canada.

(Continued)

Primary Examiner—Christopher Upton
(74) Attorney, Agent, or Firm—Baker & Hostetler LLP

(57) ABSTRACT

Described are a tertiary disinfection system and process for treating a liquid effluent from a domestic secondary treatment unit. The liquid effluent has pathogenic micro-organisms, remaining suspended solids and dissolved organic pollutants. The system has an inlet, a subterranean initial treatment zone filled with a filtering material for removing some suspended solids, dissolved organic pollutants and pathogenic micro-organisms. The initial treatment zone allows the liquid effluent to percolate downward. The system also has a subterranean polishing zone extending horizontally outward from the initial treatment zone, and filled with a filtering material having pore sizes allowing upward capillary dispersion of the liquid effluent. The system also has a subterranean aeration zone having an interface with the initial treatment zone and the polishing zone, to provide aeration enabling aerobic accommodation of microflora for disinfection of the effluent.

29 Claims, 9 Drawing Sheets

U.S. PATENT DOCUMENTS

2003/0217954 A1* 11/2003 Towndrow .................. 210/170
2006/0060523 A1    3/2006 Kerns

FOREIGN PATENT DOCUMENTS

| | | |
|---|---|---|
| WO | 0222510 A1 | 3/2002 |
| WO | 03035559 A1 | 5/2003 |
| WO | 2004087584 A1 | 10/2004 |

OTHER PUBLICATIONS

Jowett, E. Craig and Masuy, Philippe, Safe in-ground disposal of treated sewage, Environmental Science & Engineering, Jan. 2006, http://www.esemag.com/0106/biofilter.html, Viewed May 12, 2008.

Sauter, G and Leonard, K. "Wetland design methods for residential wastewater treatment"; Journal of the American Water Resources Association, vol. 33, No. 1, 1997, pp. 155-162, XP002484651.

* cited by examiner

TERTIARY SYSTEM AND PROCESS FOR TREATING A LIQUID EFFLUENT FROM AN ONSITE DOMESTIC SECONDARY TREATMENT UNIT

FIELD OF THE INVENTION

The present invention relates to the field of domestic effluent treatment and more particularly to a tertiary system and process for treating a liquid effluent from a domestic secondary treatment unit.

BACKGROUND OF THE INVENTION

Individual dwellings or residences produce domestic liquid effluent, also known as domestic wastewater. Many residences may form a community whose liquid effluents are treated by a centralized community sanitation facility. The residences of such communities are thus integrated into the centralized treatment network. However, in many cases, individual residences or groups of residences are not part of a centralized effluent treatment network, because existing centralized facilities are at or near capacity and/or the costs of incorporating the individual or group residences are prohibitive.

Until recently, individual installations for treating domestic wastewater coming from a residence were considered as a temporary solution until the residence could be included in a community treatment network. The majority of individual installations have included a septic tank, followed by a leachfield realised by embedding perforated conduits in gravel to allow the septic tank effluent to be distributed and infiltrated into the native soil. This type of installation requires soil properties that permit infiltration, a large infiltration surface and a large vertical separation between the leachfield and the ground water tables. Still, progressive accumulation of pollutants in the soil leads to failures of such installations, particularly in the long term.

Primary, Secondary and Tertiary Systems

Individual residences therefore may require a local sanitation facility for treating their liquid effluents. Local sanitation facilities normally include primary and secondary systems, and in some applications they may include a tertiary treatment system.

"Primary systems" usually include a septic tank where sedimentation and flotation are used to separate the coarse and floating solids from the source wastewater. Primary systems may also include a biological decomposition of organic material in anaerobic conditions. The treated liquid exiting the primary system often has suspended solids (SS) between 50 and 80 mg/L and a biological oxygen demand ($BOD_5$, the amount of dissolved oxygen consumed in five days by biological processes breaking down organic matter) between about 140 and 200 mg/L; a concentration of fecal coliforms of about 1,000,000 CFU/100 ml; phosphate concentrations of 5 to 15 mg/L; and total nitrogen concentrations of about 40 to 100 mg/L.

"Secondary systems" receive the primary treated effluent and enable an additional reduction of suspended solids and biological oxygen demand. The secondary system ensures a degradation of the organic matter by an aerobic biological process combined with or followed by a step of physical separation by sedimentation or filtration of the biological residues that are produced. For domestic wastewater treatment facilities, this secondary step can be achieved by a number of types of set-ups, the most frequently found of which are vertical sand filters, aerobic treatment units with or without fixed film media, biofiltration systems with organic or synthetic media, and constructed wetlands. The secondary treated liquid effluents emitted from such secondary systems usually have SS between 15 and 30 mg/L; $BOD_5$ between 15 and 30 mg/L; concentrations of fecal pathogens between 25,000 and 200,000 CFU/100 ml; and levels of nitrogen and phosphates that have not been significantly reduced.

"Tertiary systems" further treat the liquid effluent emitted from the secondary system. Tertiary systems may be designed to further reduce the SS and $BOD_5$ of the liquid effluent, to disinfect the liquid and/or to reduce the available nutrients in the liquid. A variety of physical, biological and chemical techniques may be involved depending on the parameters to control and treat. The tertiary treated effluents usually have a SS and $BOD_5$ below 10 mg/L, a coliform level below 200 CFU/100 mL, a total phosphate concentration below 1 mg/L and a total nitrogen reduction of 50%.

In the field of "onsite" wastewater treatment, the wastewaters produced by individual residences are characterized by large fluctuations in flow rates and loading during single days and are a function of the habits of the residents. Variations are also observed on weekly and monthly bases according to the permanent or seasonal occupation of the residence, weekend activities, vacation periods, etc. Thus, onsite treatment of residential or single-dwelling domestic wastewaters is quite different from networked community domestic wastewater treatment, in that the numerous members of the latter produce a buffering effect on the individual variations of each residence. Also, community facilities do not experience prolonged periods of zero input.

Pathogenic Organisms from Domestic Wastewater

Every year, people become ill from the consumption of or exposure to contaminated water. Many outbreaks of waterborne illness have been associated with the consumption of untreated or inadequately treated ground water.

The majority of the outbreaks for which an etiologic agent has been identified are caused by micro-organisms, including bacteria, viruses and parasites. Typically, about 10% or less of the outbreaks are caused by chemicals. Approximately half of the outbreaks generally have no identified etiologic agent, and are listed as acute gastrointestinal illness. It is likely that the majority of these are also caused by pathogenic microorganisms.

Since the early seventies, most of the installations installed to treat wastewater generated by individual homes were based on onsite wastewater disposal systems. These installations include a septic tank connected to a secondary system such as soil leach field, biofilter, aerobic treatment unit and/or constructed wetland. Little treatment of microbial pathogens occurs in the septic tank. Biological stabilization and pathogen removal mostly take place in the secondary system. Some of these systems are effective in reducing some microbes and pathogens.

The four types of pathogenic micro-organisms potentially present in human excreta are viruses, bacteria, protozoa and helminth eggs.

Viruses are very small, between about 0.02 and 0.10 μm, and are intracellular parasites made of nucleic acids (RNA or DNA) enclosed in a protein capsid. Inside a host, viruses divert most of the hosts' cellular machinery into viral replication until cell death. Outside of a host, viruses behave as abiotic colloidal particles. Because of their replication mechanism, viruses are very host specific. The types of viruses found in septic tank effluent are not all pathogenic to human cells. Most of them are called enteric bacteriophages because they need some specific gastrointestinal bacteria to multiply. However, some species are specific to human cells. They can cause a wide variety of diseases ranging from gastroenteritis to infectious hepatitis.

Bacteria are prokaryotic cellular organisms from about 0.2 to about 6 µm in size. The majority of bacteria in septic tank effluent are not true pathogens. Most are the normal flora which resides in the gut. However, some enteric bacterial pathogens can cause diseases ranging from gastroenteritis to ulcers to typhoid fever.

Protozoa are unicellular eukaryotic organisms from about 1 to 15 µm in size. They are generally shed from the gut in an environmentally stable cyst form. Diseases caused by enteric protozoa include gastroenteritis and dysentery.

Helminthes are intestinal worms. They are multicellular eukaryotic parasites. Helminth ova, which are about 30-100 µm in size, may be shed in feces.

As mentioned above, initial pathogen treatment occurs in the septic tank and includes removal by the settling of feces. It may be that a greater percentage of protozoan cysts and helminthes ova may be removed than bacteria or viruses during this process due to their much larger size. Removal efficiencies for all four pathogen types range from 0 to 2 $\log_{10}$ in the septic tank. The number of pathogens in septic tank effluent may reach $5\times10^5$ to $2\times10^6/100$ mL. The addition of a secondary treatment after the septic tank increases the pathogens removal, but the four types of pathogens are potentially present in the secondary effluent. Even with the use of more efficient secondary systems, such as peat filter, remaining pathogens have been observed in the treated effluent. In that case, most of them are viruses as well as motile and smaller bacteria able to pass through the effective pore size of the filter.

Infiltration of primary or secondary treated liquids within the soil involves disadvantages, particularly in certain soil conditions and characteristics. In fact, ideal sites for wastewater infiltration are less and less numerous. Furthermore, the erection of new residences in areas with certain environmental constraints such as low soil permeability, proximity to ground water table, etc., makes many known treatment installations insufficient.

Infiltrating secondary effluent into the soil, a known practice for a domestic onsite installation, has the potential to degrade groundwater quality depending on the limitations of the soil itself and the particular infiltration method. Even if some degree of disinfection may occur as wastewater percolates through soil presenting good infiltration capacity, known infiltration systems present difficulties especially in limitative soil and domestic wastewater applications.

In many cases, tertiary treatment is indeed desirable for further disinfection for onsite domestic wastewater treatment, mainly when the soil conditions do not allow infiltration for final disposal.

Types of Tertiary Systems

There are several different types of tertiary systems known in the field. For instance, there have been disinfection systems using filtration membranes, chlorination, UV light treatment, or ozone disinfection. These systems have several drawbacks such as toxicity, fouling concerns, management intensiveness, inefficiency, and being not cost effective for individual or small group facilities.

Passive systems have also been used for tertiary treatment of liquid effluents. For instance, biological systems such as biofilters or constructed filtering wetlands with long liquid retention times have been used to treat liquid coming from a secondary treatment system.

Passive Treatment Systems

Some onsite residential passive filter systems have been used for disinfecting effluent. The operation of such filters consists of a solid-liquid-gas triphasic system.

Principles of Passive Triphasic Systems

Equation 1 shows the relation existing between the three phases (solid, liquid, gas) in terms of hold-up corresponding to a fraction of the total volume of the reactor occupied by each of these phases.

$$1=\epsilon_S+\epsilon_L+\epsilon_g \quad (1)$$

The solid hold-up, or $\epsilon_S$, can be subdivided in three components.

$$\epsilon_s=\epsilon_s^m+\epsilon_s^b+\epsilon_s^p \quad (2)$$

where $\epsilon_s^m$ corresponds to the fraction of solid volume occupied by the filtering material, $\epsilon_s^b$ corresponds to the fraction of solid volume occupied by the biomass and $\epsilon_s^p$ corresponds to the fraction of volume occupied by the particulate materials retained in the trickling bed.

The liquid hold-up, or $\epsilon_L$, can be subdivided in two components:

$$\epsilon_L=\epsilon_L^s+\epsilon_L^d \quad (3)$$

where $\epsilon_L^d$ corresponds to the fraction of liquid volume occupied by the liquid in movement or flowing and $\epsilon_L^s$ corresponds to the fraction of liquid volume occupied by the static liquid held up in the trickling bed.

In the same way, gaseous hold-up, or $\epsilon_g$ can be subdivided in two components, that is a static component ($\epsilon_g^s$) and a dynamic component ($\epsilon_g^d$):

$$\epsilon_g=\epsilon_g^s+\epsilon_g^d \quad (4)$$

Vertical Sand Filters

Vertical sand filters were originally developed for filtration of potable water after a first treatment of coagulation/flocculation to retain the fine particles from that chemical treatment. Such vertical sand filters are operated in saturated mode with a frequent counter-current washing. For wastewater treatment, most vertical sand filters are operated in a percolating non-saturated mode and have been usually used to treat liquids emitted from a primary treatment system. In percolating mode, vertical sand filters must have a surface area and height sufficient to ensure the necessary retention time of the liquid, to promote the various phenomena implicated in wastewater disinfection in aerobic conditions. However, considering the hydrodynamic conditions in vertical flow filters, which may involve hydraulic breakage and/or upward capillary dispersion, vertical filters for tertiary treatment of domestic liquid effluents used at a hydraulic loading rate around 50 L/m²/day, would need to be 600 to 900 mm high to ensure a sufficient non-saturated zone. Considering the surface area required, the efficiency of the vertical sand filters is also dependant on a uniform distribution of the wastewater over the top surface, which would require a controlled distribution system under low pressure. Vertical sand filters have several drawbacks when it comes to tertiary treatment.

Vertical-Horizontal Sand Filter

Referring to FIG. 1 (PRIOR ART), a vertical-horizontal sand filter A has also been used as a treatment system, in particular for completing the disinfection of an effluent coming from a constructed wetland, which offers a long retention time. This effluent contains less than 2 mg/L in SS and $BOD_5$, and has an average fecal coliform concentration of 4 CFU/100 ml, which already conforms to tertiary treatment standards at the entrance to the vertical-horizontal sand filter A.

This vertical-horizontal sand filter A has an inlet means B that feeds the wastewater vertically onto the horizontal sand-packed section C, with a length of about 3 m, and the wastewater flows horizontally downstream to the outlet D. This vertical-horizontal sand filter A has a short horizontal distance and a low retention time offering limited disinfection capacity. Also, the gravitational inlet means B enables limited distribution of the effluent and is embedded within the sand packing, which would increase the chance of undesirable flow channels being formed. In such liquid-saturated flow channels, a dynamic liquid hold-up ($\epsilon_L^d$) would dominate limiting the gas hold-up ($\epsilon_g$). Utilizing this sand filter A with a more polluted secondary effluent, having for instance a suspended solid matter and $BOD_5$ of about 30 mg/L, would lead to the development in the liquid-saturated zones of an anaerobic clogging biofilm ($\epsilon_s^b$) due to the reduction in gas hold-up ($\epsilon_g$). With time, progressive clogging of the entrance would occur, from the accumulation of biomass and suspended solids, leading to the failure of the filter A.

The sand-packed section C is covered with top soil E, which leads to disadvantages in maintaining and ensuring that sufficient aerobic biological disinfection occurs in the sand-packed section C. An impermeable geo-membrane F may be provided below and above the sand-packed section C. However, this vertical-horizontal sand filter A may become smothered and soaked with precipitation from above and/or blocked up from the soil's freezing or becoming covered with snow or ice. Such effects adversely influence the aerobic disinfection by not allowing sufficient aeration in the surrounding soil E and/or the sand-packed section C.

The tertiary wastewater treatment systems that have been used in the field have disadvantages such as lack of longevity, incomplete or unreliable treatment, limited adaptability to different soil conditions and characteristics, particularly in sensitive environments such as lakeside properties, and limited adaptability to fluctuations in liquid effluent input.

The technologies in the field have several disadvantages in treating secondary liquid effluent. There is indeed a need in the field of tertiary treatment systems in domestic applications for an improved technology that can overcome at least some of the disadvantages of what is known in the field.

SUMMARY OF THE INVENTION

The present invention responds to the above-mentioned need by providing a tertiary disinfection system and process for treating a liquid effluent from a domestic secondary treatment unit.

Accordingly, the system is for treating a liquid effluent from a domestic secondary treatment unit, the liquid effluent including pathogenic micro-organisms, remaining suspended solids and dissolved organic pollutants. The system includes an inlet for receiving the liquid effluent. The system also includes a subterranean initial treatment zone filled with a filtering material for at least partially removing the remaining suspended solids, the dissolved organic pollutants and the pathogenic micro-organisms. The initial treatment zone has top and bottom sections, the top section being in fluid communication with the inlet for receiving and allowing the liquid effluent to percolate downward toward the bottom section. The system also includes a subterranean polishing zone extending horizontally outward from the initial treatment zone. The polishing zone has a first end interfacing with the initial treatment zone for receiving the liquid effluent therefrom and a second end opposite to the first end for outflowing a treated effluent. The polishing zone further has a bottom floor sloping downhill from the first end toward the second end and is filled with a filtering material having pore sizes allowing upward capillary dispersion of the liquid effluent flowing from the first end toward the second end. The system further includes a subterranean aeration zone having an interface with the initial treatment zone and the polishing zone, the interface being sized so as to provide aeration enabling the initial treatment zone and the polishing zone to aerobically accommodate microflora for competing with, consuming, grazing, adhering to and/or breaking down the pathogenic micro-organisms, and thereby produce the treated effluent at the second end of the polishing zone.

The system enables, thanks mainly to the subterraneous aeration zone that maintains and ensures adequate aeration into the initial treatment zone and the polishing zone, to increase the treatment efficiency of the liquid effluent.

The present invention also provides a tertiary disinfection process for treating a liquid effluent from a domestic secondary treatment process, the liquid effluent pathogenic micro-organisms, remaining suspended solids and dissolved organic pollutants, the process including the steps of:

a) percolating the liquid effluent downward through a subterranean initial treatment zone filled with a filtering material, to at least partially remove the remaining suspended solids, the dissolved organic pollutants and the pathogenic micro-organisms;

b) flowing the liquid effluent from the initial treatment zone horizontally through a subterranean polishing zone interfacing with the initial treatment zone and comprising a filtering material having pore sizes allowing upward capillary dispersion of the liquid effluent; and c) aerating the initial treatment zone and the polishing zone to aerate the initial treatment zone and the polishing zone to enable aerobical accommodation of microflora therein for competing with, consuming, grazing, adhering to and/or breaking down the pathogenic micro-organisms, to thereby produce a treated effluent.

Many preferred and optional aspects of the system and the process will be understood upon reading the description herein below.

DETAILED DESCRIPTION OF THE EMBODIMENTS

Figure 1:
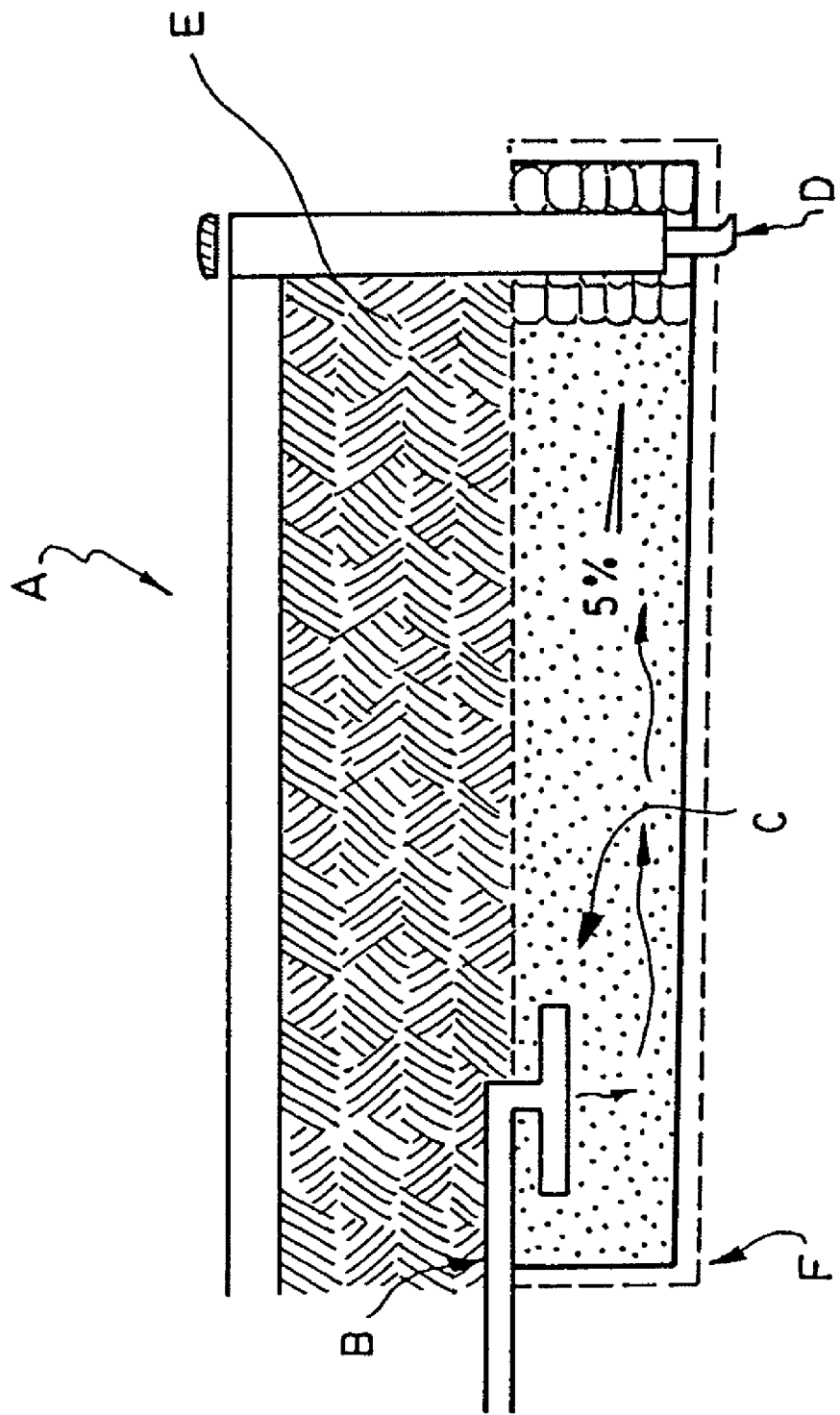
FIG. 1 (PRIOR ART) is a dies elevation cross-sectional view of a vertical-horizontal sand filter known in the field.

Various aspects and embodiments of the tertiary liquid effluent treatment system and process of the present invention will be described in relation to the Figs.

Referring to FIGS. 2, 5, 7 and 9, the tertiary disinfection system 10 is for treating a liquid effluent 12 includes a subterranean initial treatment zone 14 through which the liquid percolates downward, a subterranean polishing zone 16 in which the liquid flows horizontally outward and disperses upward, and a subterranean aeration zone 18 that provides aeration to the initial treatment zone 14 and the subterranean polishing zone 16. The aeration enables aerobic accommodation of microflora within the initial treatment zone 14 and the subterranean polishing zone 16 for at least competing with, consuming, grazing, adhering to and/or breaking down pathogenic micro-organisms, to thereby produce a treated effluent 20.

Figure 7:
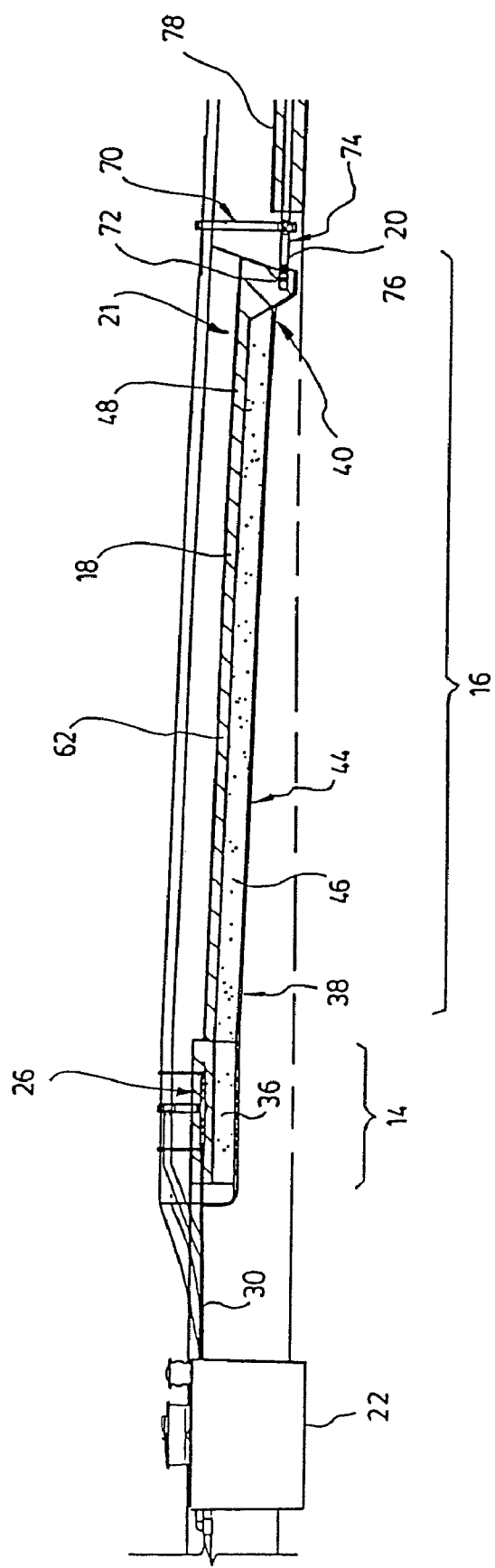
FIG. 7 is a side elevation partial cross-sectional view of the embodiment of FIG. 6.
Figure 9:
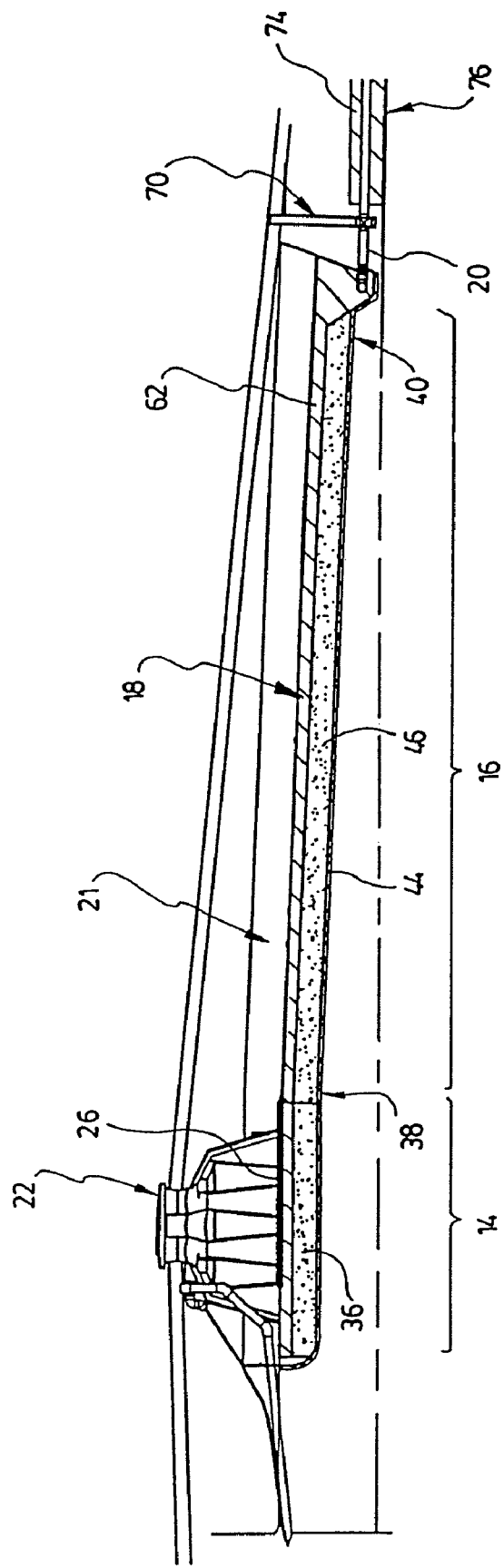
FIG. 9 is a side elevation partial cross-sectional view of the embodiment of FIG. 8.

Referring to FIGS. 7 and 9, the term "subterranean", in reference to the zones 14, 16, 18, means that the zones are covered by a natural or artificial covering material 21, such as soil. In a preferred aspect of the system 10, the zones are below the natural surface of the soil and follows the geological grade. In such a case, the zones may be invisible to a viewer and there may be grass, plants and the like within the covering soil. Nevertheless, depending on the architectural, weather and geological constraints of an installation site, the zones may be raised above the natural grade yet remain artificially covered with soil or the like to be subterranean.

Being subterranean enables the system 10 to efficiently maintain conditions for treating the various pollutants and accommodating the microflora.

The aerobic conditions in the initial treatment zone 14 and the polishing zone 16 enable the microflora to thrive while establishing an unfavourable ecosystem for the pathogenic micro-organisms.

The microflora occurs mainly naturally in the system 10. It should also be understood that certain microflora could also be added into the system 10 if desired.

Figure 5:
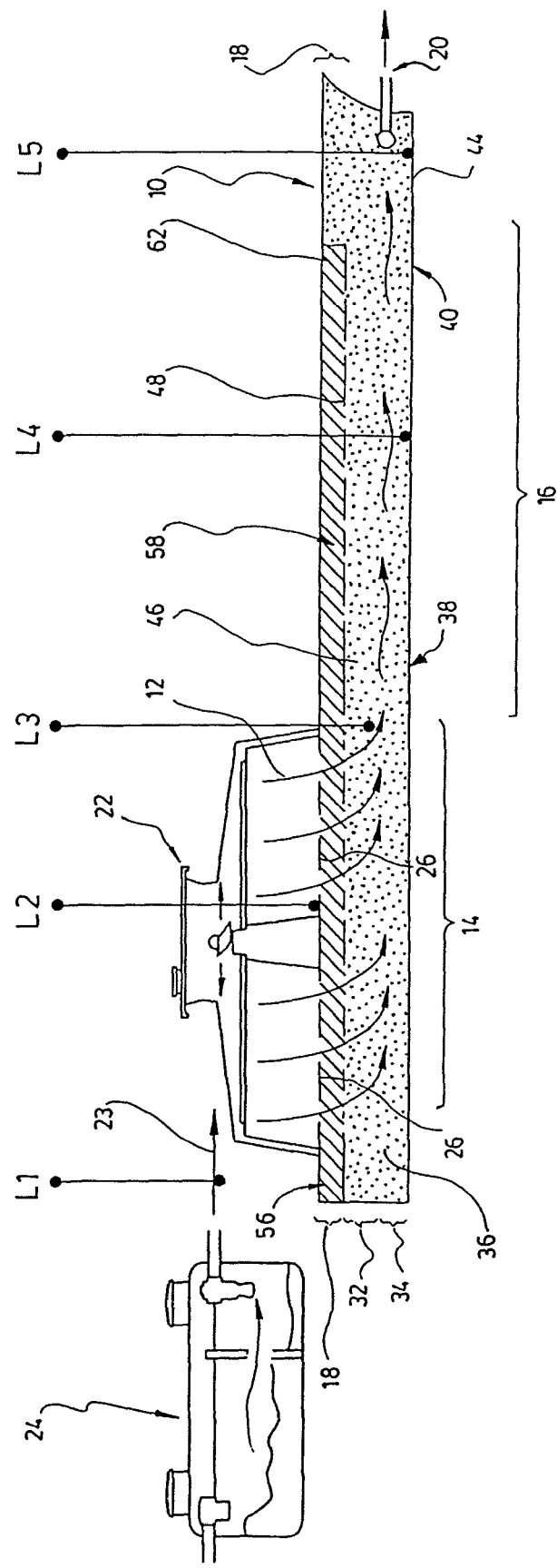
FIG. 5 is a side elevation partial cross-sectional view of an embodiment of the tertiary disinfection system of the present invention, integrated downstream of secondary and primary treatment systems.

Referring to FIGS. 5, 7 and 9, the tertiary disinfection system 10 is for treating the liquid effluent 12 that is emitted from an onsite domestic secondary treatment unit 22. Referring to FIG. 5, the secondary treatment unit 22 receives a wastewater liquid 23 from a primary system 24, which is illustrated here as a septic tank with two compartments.

The secondary unit 22 may be a biofilter, such as a peat biofilter known under the trademark Ecoflo®, or described in U.S. Pat. Nos. 5,618,414 and 5,206,206, but may also be another type or model of secondary unit.

Figure 6:
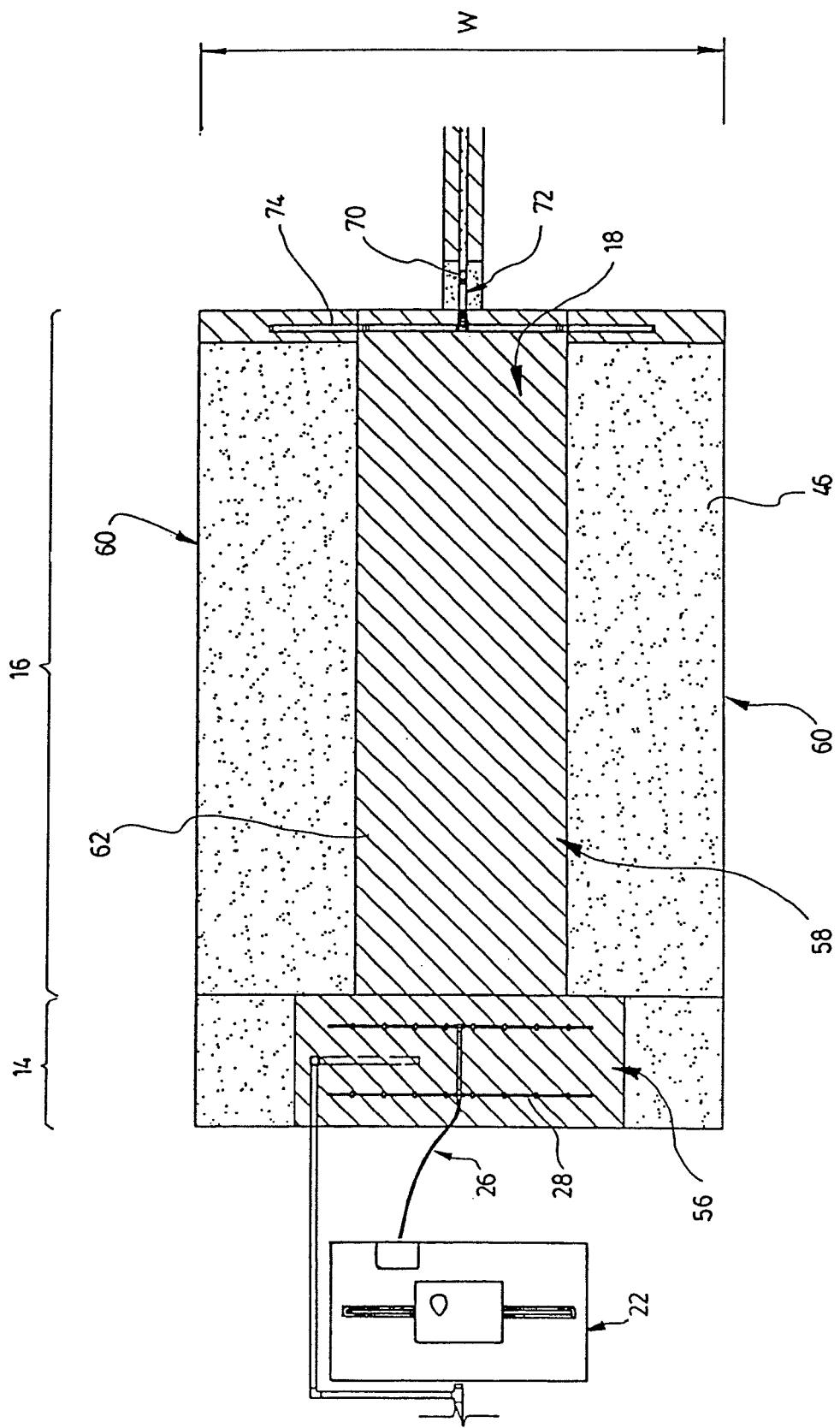
FIG. 6 is a top plan view of another embodiment of the tertiary disinfection system of the present invention, downstream and forwardly spaced apart from a secondary treatment system.

FIGS. 6 and 7 illustrate an embodiment wherein the tertiary system 10 is downstream from a closed-bottom peat biofilter 22.

Figure 8:
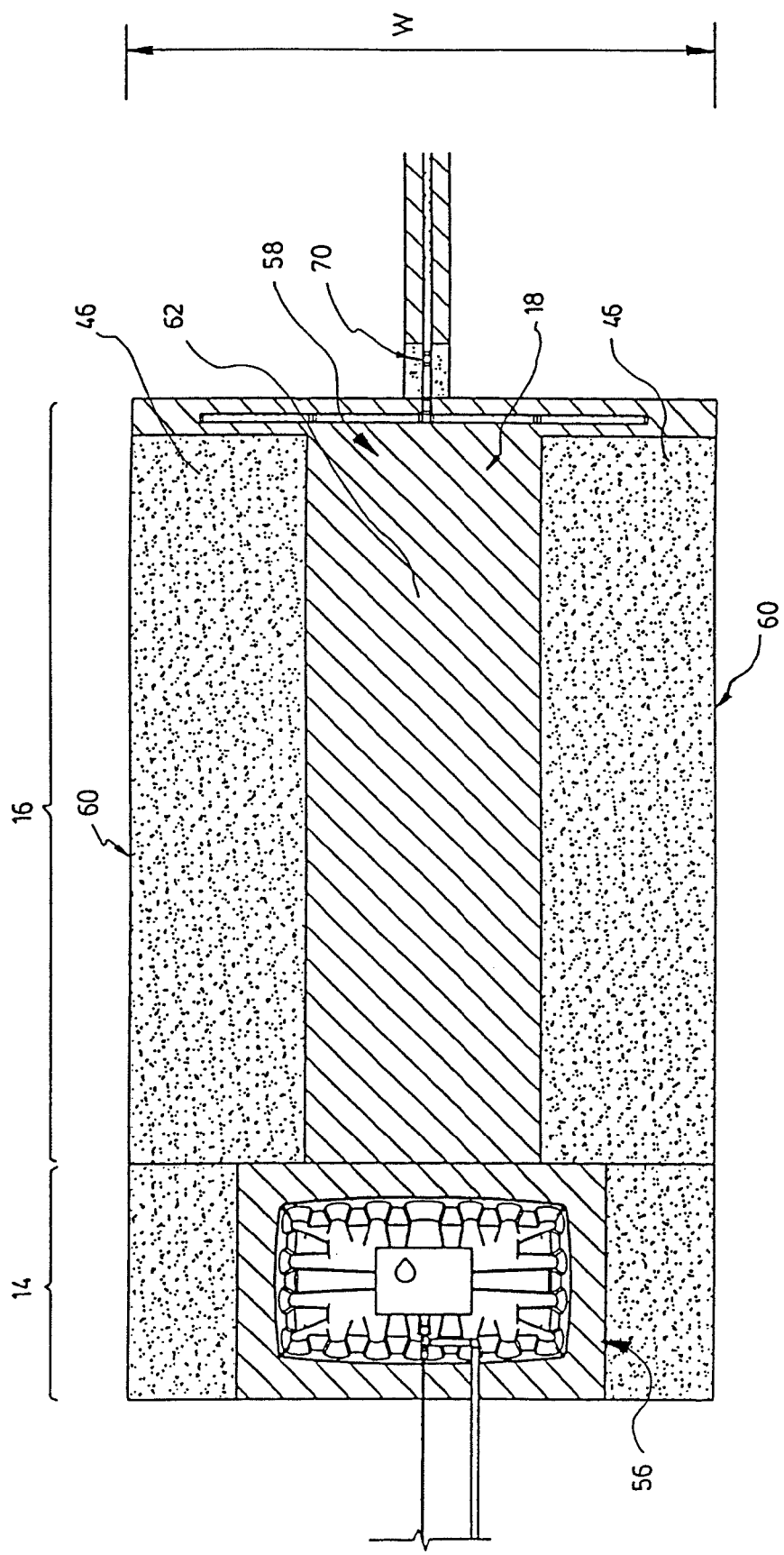
FIG. 8 is a top plan view of another embodiment of the tertiary disinfection system of the present invention, the initial treatment zone being beneath the secondary treatment system.

FIGS. 8 and 9 illustrate another embodiment wherein the tertiary system 10 is downstream from and beneath an open-bottom peat biofilter 22.

Referring to FIGS. 5, 7 and 9, the liquid effluent 12 coming from the secondary unit 22 includes pathogenic micro-organisms as well as remaining suspended solids and dissolved organic pollutants. The liquid effluent 12 also contains nitrogen, phosphates and other pollutants.

Referring to FIGS. 2, 5, 7 and 9, the tertiary system 10 includes an inlet 26 for receiving the liquid effluent 12.

Referring now to FIG. 6, the inlet 26 may include a distributor 28 arranged above the initial treatment zone 14 for evenly distributing the liquid effluent 12 onto the initial treatment zone 14. The distributor may also have control and detection means to provide a particular dosage when needed. The distributor 28 may be composed of two spacedly arranged and optionally parallel pipes with perforations along their length, operated at low pressure, often around 0.6 to 0.9 m of water column. Even distribution of the inlet liquid 12 enables improved hydraulic and hydrodynamic phenomena prevailing in the initial treatment zone 14. For instance, even distribution may reduce the occurrence of flow channels being formed and thus increases the static liquid hold-up. Preferably, this inlet 26 provides the effluent 12 over a surface varying between 7 and 9 m$^2$ according to the design flow for a single-family dwelling or residence.

Referring to FIGS. 6 and 7, the distributor 28 may be connected to the secondary treatment unit 22 with tubes 30.

Alternatively, as shown in the embodiment of FIG. 9, the inlet 26 may be provided directly below the secondary treatment unit 22.

Figure 2:
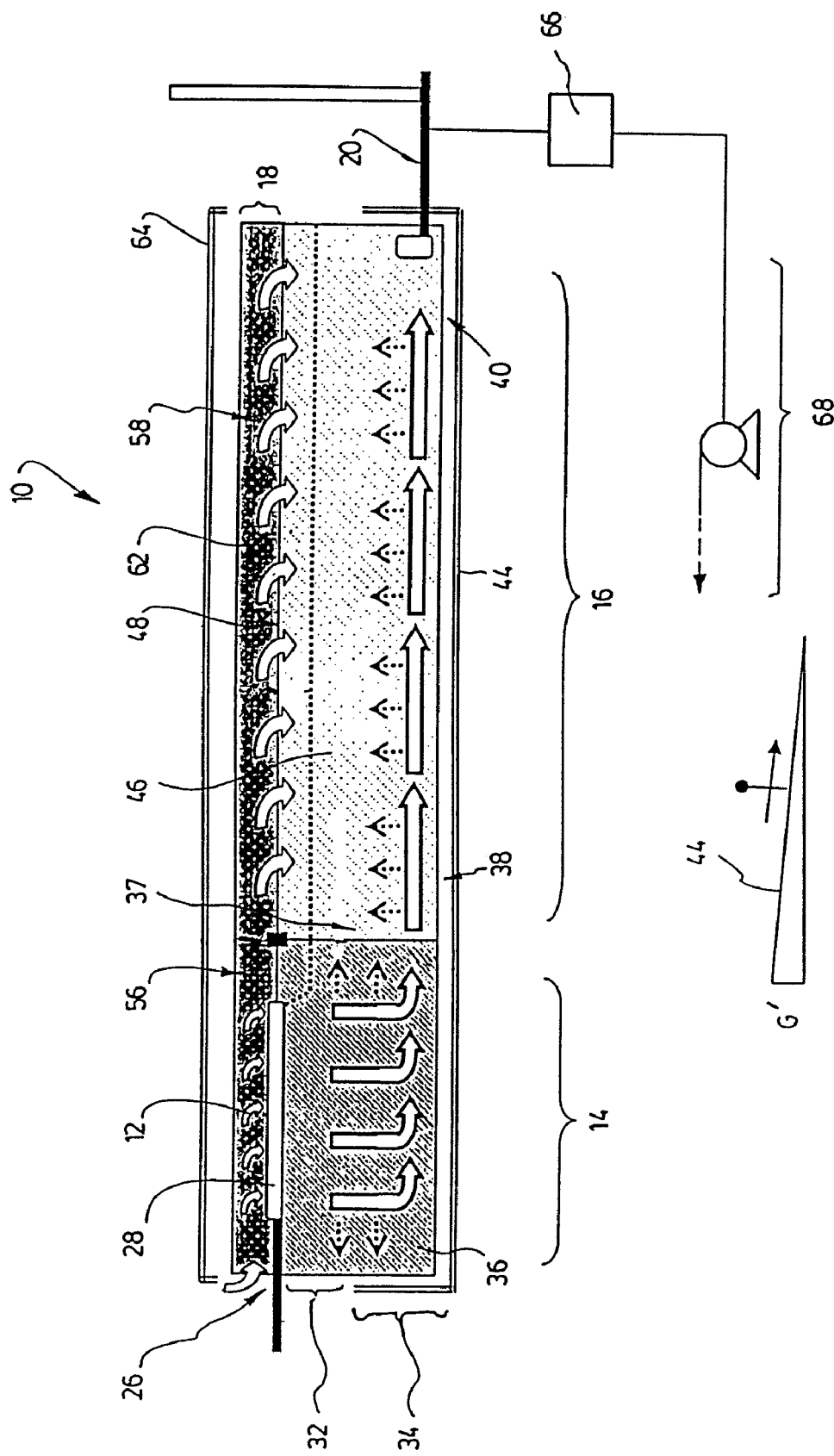
FIG. 2 is a side elevation cross-sectional view of an embodiment of the tertiary disinfection system of the present invention, showing liquid and air flow with solid arrows and capillary dispersion in phantom arrows.

Referring to FIGS. 2 and 5, the initial treatment zone 14 has top 32 and bottom 34 sections, for receiving the liquid effluent 12 at the top section 32 and allowing the liquid effluent 12 to percolate downward toward the bottom section 34.

The initial treatment zone 14 may also be referred to as a "roughing zone" as it removes primarily coarser particles and some pathogenic micro-organisms. The initial treatment zone 14 enables a filtration of the particles present in the effluent 12, a biodegradation of the dissolved organic pollutants remaining in the effluent and the removal of certain pathogenic organisms.

The initial treatment zone 14 is filled with a filtering material 36. The pore sizes of the filtering material allow the liquid 12 to percolate downward while filtering the liquid to remove some of the suspended solid particles and some of pathogenic micro-organisms. Furthermore, the aeration provided by the aeration zone 18 facilitates the aerobic accommodation of aerobic microflora within the initial treatment zone 14, tresponsable for biodegradation of pollutants and biological disinfection. Thus, predation and competition phenomena within the initial treatment zone 14 take place to remove weaker pathogenic micro-organisms. The initial treatment zone 14 mainly removes the larger micro-organisms and some smaller micro-organisms that are affixed to larger particles or micro-organisms.

After the liquid effluent 12 passes through the initial treatment zone 14, the polishing zone 16 then enables further removal of smaller micro-organisms or stronger micro-organisms as will be further discussed herein below.

Referring to FIG. 2, when the liquid effluent 12 flows downward through the initial treatment zone 14, it may also experience horizontal capillary dispersion (illustrated with horizontal phantom arrows). It should be noted that this horizontal capillary dispersion may propagate toward a bordering region 37 between the initial treatment zone and the polishing zone.

More regarding the upward capillary dispersion from the polishing zone 16 will be discussed herein below.

The horizontal dispersion is particularly pronounced during transitional conditions at the beginning of a feeding period. After this transitional period, prolonged constant feeding of the initial treatment zone 14 results in an equilibrium characterized by a dominance of vertically descending liquid flow. Where there is vertically descending flow, one observes principally a dynamic liquid hold-up ($\epsilon_L^d$). In the region where horizontal capillary dispersion occurs, one observes mainly a static liquid hold-up ($\epsilon_L^S$) accompanied by gas hold-up ($\epsilon_g$). The liquid hold-up decreases the further it is away from the vertically descending liquid. Beyond a certain distance, one observes solely static and dynamic gas hold-up ($\epsilon_g^S + \epsilon_g^d$) It should be noted that the hydraulic loading rate applied on the initial treatment zone 14 and the porosity and granulometry of the filtering material 36 may influence the relative importance of the different types of fluid (gas and liquid) hold-up. These same parameters can influence the transfer phenomena established between the two types of liquid hold-up ($\epsilon_L^s + \epsilon_L^d$), as described in United States and Canadian patent Nos. 6,602,407 and 2,410,541 respectively.

Referring to FIGS. 2, 5, 7 and 9, the subterranean polishing zone 16 extends horizontally outward from the initial treatment zone 14. More particularly, the polishing zone 16 has a first end 38 interfacing with the initial treatment zone 14 for receiving the liquid effluent 12 therefrom and a second end 40 opposite to the first end for outflowing a treated effluent 20.

The polishing zone 16 enables the final treatment of the liquid effluent 12. This polishing treatment includes filtering residual particulate material coming from the initial treatment zone 14 or resulting from broken off biomass that was formed in the polishing zone 16 itself. In addition, the polishing zone 16 may remove the dissolved organic pollutants if any remain in the liquid. Also, intense competition and predation phenomena occur in this zone 16, which enable the removal of most of the pathogenic micro-organisms present. In fact, this disinfection capacity is enabled by the hydrodynamic conditions occurring in the polishing zone 16.

Referring to FIGS. 2, 7 and 9, the polishing zone 16 further has a bottom floor 44 sloping downhill from the first end 38 toward the second end 40. The bottom floor 44 may be lined by an impermeable membrane that is inserted within a pre-dug cavity before pouring in the filtering materials. Optionally, the bottom floor 44 of the polishing zone 18 is simply defined by the naturally occurring soil, clay or other geological material in which the polishing zone is located and which enables the liquid 12 to flow toward the second end of the polishing zone 16. The bottom floor 44 may have a downhill slope toward the second end from about 2% to about 8% grade G'. In one embodiment, the grade G' is about 4 to 5%. This grade range enables the horizontal flow of liquid and an appropriate balance of upward capillary dispersion and gas hold-up in the polishing zone 16 for the aerobic disinfection. An insufficient grade would result in too much capillary dispersion and a reduction in gas hold-up in the polishing zone 16; whereas an overly steep grade would result in insufficient liquid retention time in the polishing zone 16.

Preferably, the impermeable membrane used to line the bottom floor 44, is also used to line the side walls of the system 10. This enables avoiding unwanted exfiltration of the effluent outside the system's side walls and infiltration of unwanted external water.

Referring to FIGS. 2-9, the polishing zone 16 is filled with a filtering material 46 having pore sizes allowing upward capillary dispersion of the liquid effluent flowing from the first end 38 toward the second end 40. The upward capillary dispersion is shown by upward phantom arrows in FIGS. 2 and 3. The pore sizes also enable the aerobic accommodation of microflora, as will be explained further below.

Referring to FIGS. 2 and 4-9, the subterranean aeration zone 18 is arranged along the polishing zone 16 and the initial treatment zone 14 and provides aeration into these zones. Again, the term "subterranean", in reference to the aeration zone 18, means that the aeration zone 18 is covered by a natural or artificial covering material 21.

Referring to FIGS. 2, 5, 7 and 9, the subterranean aeration zone 18 has an interface 48 with the initial treatment zone 14 and the polishing zone 16. The interface 48 is sized so as to provide aeration enabling the initial treatment zone 14 and the polishing zone 16 to aerobically accommodate microflora for competing with, consuming, grazing, adhering to and/or breaking down the pathogenic micro-organisms. This aerobic accommodation of microflora allows the liquid effluent 12 to be disinfected and the treated effluent 20 is thus produced at the second end 40 of the polishing zone 16.

In a preferred aspect of the system 10, the aeration zone 18 is provided above the initial treatment zone 14 and the polishing zone 16 to provide downward aeration thereto. Alternatively, the aeration zone 18 may be provided on the side of the zones or embedded therein at an appropriate depth.

Figure 3:
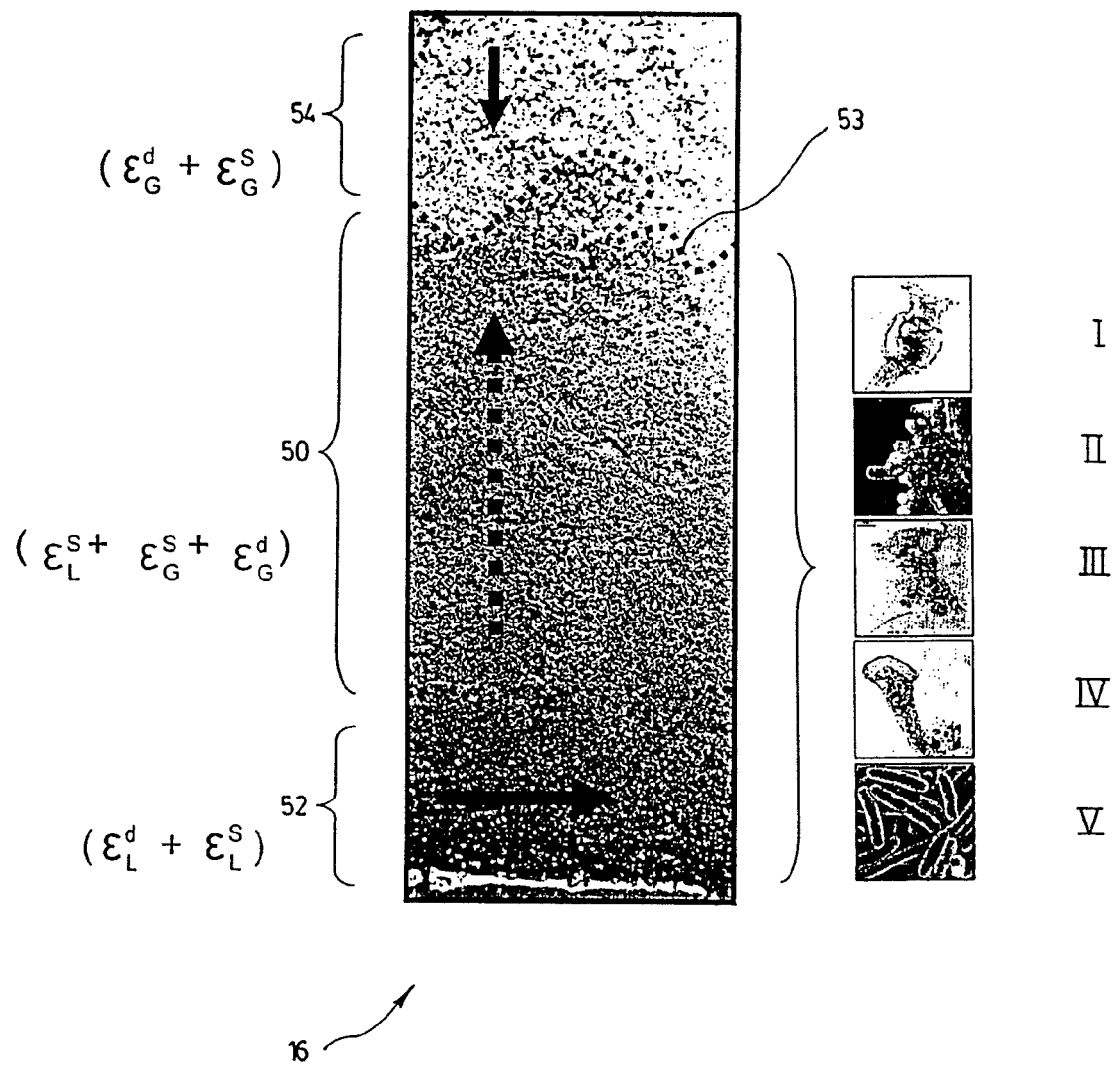
FIG. 3 is a partial side elevation cross-sectional photograph and schematic indicators, of a section of the subterranean polishing zone according to one embodiment, showing air flow with a downward solid arrow, capillary dispersion with a phantom arrow, and liquid flow with a solid horizontal arrow, and showing blown-up photographs of some of the microflora present.

Referring to FIG. 3, the upward capillary dispersion of the liquid 12 (illustrated with an upward arrow) and the downward aeration (illustrated with a downward arrow) enable a liquid non-saturated region 50 within the polishing zone 16. Since the polishing zone 16 has a water-impermeable bottom floor 44, it particularly allows a lower liquid-saturated region 52 to be formed that has a high dynamic liquid hold-up ($\epsilon_L^d$) and smaller proportion of static liquid hold-up ($\epsilon_L^s$). Similarly to the initial treatment zone's 14 displaying horizontal capillary dispersion out from its vertically descending liquid, there is upward capillary dispersion from the lower liquid-saturated region 52 of the polishing zone 16.

The liquid non-saturated region 50, also referred to as a "capillary fringe", facilitates the development of beneficial organisms such as microflora that can notably act as predators of pathogenic micro-organisms. The upper limit 53 of the liquid non-saturated region 50 can vary according to incoming flow rate to the system and the pore size of the filtering material at particular locations.

There is also an upper gas-saturated region 54 above the liquid non-saturated region 50. It should be noted that the upper gas-saturated region 54 is aerated by the aeration zone 18 and thus acts as an intermediary region for aerating the liquid non-saturated region 50. In most cases, however, the upper gas-saturated region 54 will be composed of the same filtering material as the rest of the polishing zone 16, though different materials may also be used.

Referring still to FIG. 3, the microflora in the liquid non-saturated region 50 and the lower liquid-saturated region 52 may include rotifers (I), fungi (II), amoebae (ill), ciliated grazers (IV) and bacteria (V) or mixtures thereof.

When the aeration zone 18 is provided above the polishing zone 16, the upward capillary dispersion of the liquid effluent 12 and the downward aeration within the polishing zone 16 enable efficient diffusion and convection of air.

Also, the filtering material 46 is preferably chosen to have pore sizes that enable upward capillary dispersion while enabling the upper gas-saturated region 54 to be established. Fluid inlet conditions can cause expansion and contraction of the liquid non-saturated region 50.

The liquid non-saturated region 50 contains capillary dispersion of the liquid 12 that has been pre-treated in the initial treatment zone 14. The smaller micro-organisms are more easily brought upward with the capillary dispersion of the liquid 12. The liquid retention time in the liquid non-saturated region 50 is higher than in the lower liquid-saturated region 52, thereby enabling the micro-organisms to be retained in the polishing zone 16 for an extended period of time to ameliorate disinfection. Indeed, the polishing zone 16 and the filtering material 46 are preferably sized and chosen so that the liquid retention time is longer than the lifetime of the micro-organisms to be removed.

Referring back to FIGS. 2, 5, 7 and 9, the retention time within the polishing zone 16 is a function of its length, the slope of the bottom floor 44, as well as the linear loading rate, which is the flow rate divided by the width of the zone 16.

Providing the aeration zone 18 above the initial treatment zone 14 and the polishing zone 16 also facilitates installation and maintenance of the system 10.

Referring to FIGS. 2 and 4-9, the aeration zone 18 has first 56 and second 58 portions, the first portion 56 being provided above the top section 32 of the initial treatment zone 14. This facilitates the initial treatment zone 14 to be in aerobic conditions and well drained. The first and second portions 56, 58 preferably make up a single, integral aeration zone. It should be understood however that the first 56 and second 58 portions may be separate to provide aeration separately for the initial treatment zone 14 and the polishing zone 16 respectively.

Referring to FIG. 2, the distributor 28 may be provided in between the initial treatment zone 14 and the first portion 56 of the aeration zone 18, so as to provide the liquid 12 directly onto the initial treatment zone 14. Alternatively, the distributor 28 may be provided above or within the aeration zone 18.

Referring to FIGS. 5 and 8, this embodiment shows the secondary unit 22 provided above the first portion 56 of the aeration zone 18. In this case, the aeration device of the secondary unit 22 interfaces with the first portion 56 of the aeration zone 18 so that the air first flows downward into the first portion 56 and then flows horizontally into the second portion 58 as well as downwardly into the initial treatment zone 14 and polishing zone 16.

In a preferred aspect of the system 10, the first portion 56 of the aeration zone 18 is in fluid communication with the atmosphere. The aeration zone 18 may be communicating with the aeration device of the secondary system (as mentioned above and shown in FIGS. 5, 8 and 9), with a pumping station, or with the vent of the residence (not shown). It is also possible that there are one or more air inlets, such as vertical pipes, connected to the aeration zone 18.

Figure 4:
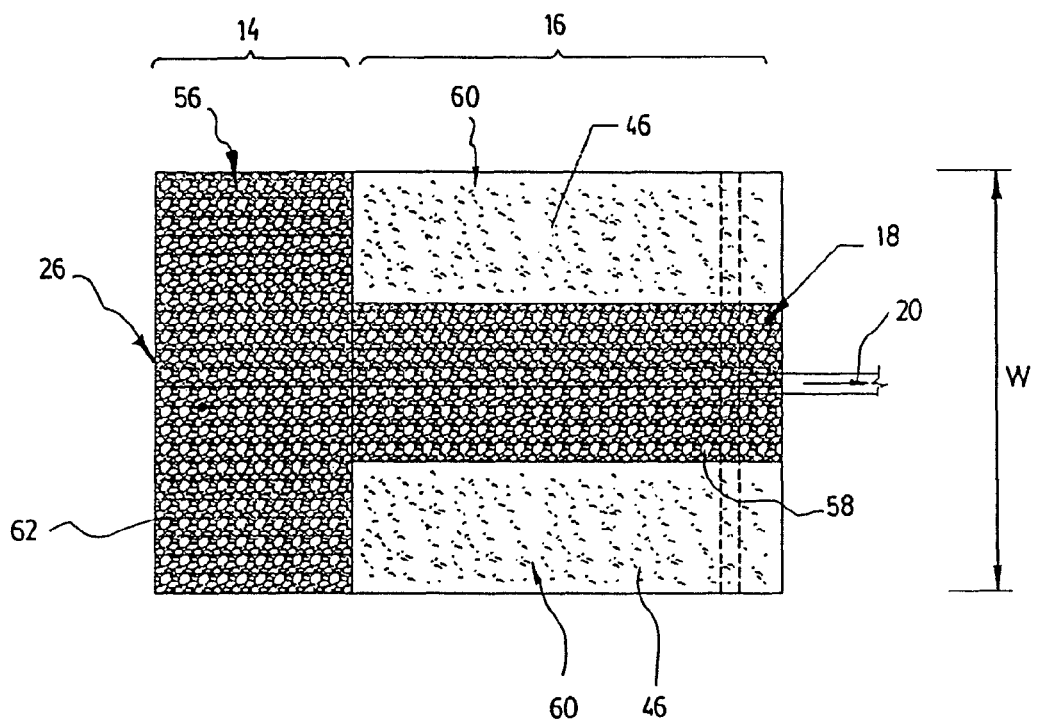
FIG. 4 is a top plan view of an embodiment of the tertiary disinfection system of the present invention.

The aeration zone 18 may also be provided in a variety of arrangements from providing the interface 48 with the polishing zone 16. Referring to FIGS. 4, 6 and 8, viewed from above, the second portion 58 of the aeration zone 18 is strip-shaped along the center of the polishing zone 16, leaving side regions 60 with a top surface uncovered by the aeration zone 18. Alternatively, the aeration zone 18 may be provided over the entire top surface of the polishing zone 16 or at selected areas to provide aeration.

Referring to FIGS. 2, 5, 7 and 9, the interface 48 between the aeration zone 18 and the initial treatment zone 14 and the polishing zone 16 may be a flat planar surface, but it may also be cylindrical or other shapes. In the illustrated embodiments, the interface 48 is substantially planar, but it may also be cylindrical if the aeration zone 18 is constructed as an embedded aerating tube. Indeed, the interface 48 may have a variety of designs and shapes, to be sized to enable aeration into the initial treatment 14 and polishing 16 zones for aerobic disinfection of the pathogenic micro-organisms.

Referring to FIG. 3, the aeration zone (not illustrated here) preferably creates the upper gas-saturated region 54 within the polishing zone 16. This upper gas-saturated region 54 allows gradual infiltration of the air by convection and diffusion within the liquid non-saturated region 50 where intense disinfection occurs.

Referring back to FIGS. 2, 5, 7 and 9, the aeration zone 18 and the upper gas-saturated region 54 contain very few micro-organisms because in terms of fluids they exclusively have gas hold-up ($\epsilon_g^s + \epsilon_g^d$). The aeration zone 18 enables the air within the initial treatment 14 and polishing 16 zones to be replenished as needed. Thus, the aeration zone 18 and the upper gas-saturated region 54 present gas hold-up that is not only static ($\epsilon_g^s$) but is also dynamic ($\epsilon_g^d$).

It should be noted that the liquid effluent 12 at the inlet 26 contains preferably dissolved oxygen, as it comes from the secondary treatment that is also aerobic.

Referring to FIG. 2, an even distribution of the liquid effluent 12 improves the aeration of the liquid within the initial treatment zone 14, encourages horizontal capillary dispersion of the liquid (illustrated with phantom horizontal arrows) and increases the liquid non-saturated region for improved aerobic disinfection.

Referring to FIGS. 2 and 6-9, the distributor 28 may be arranged within the perimeter of the first portion 56 of the aeration zone 18 to ensure that the inlet liquid 12 is aerated as it enters the initial treatment zone 14.

Referring to FIGS. 2 and 4-9, the second portion 58 of the aeration zone 18 may extend along the polishing zone 16 to its second end 40. Providing the aeration zone 18 along the entire length of the polishing zone 16 enables aeration along this length to increase gas exchange in the liquid non-saturated region within the polishing zone 16. Also, an extended aeration zone 18 may increase the adaptability of the tertiary system 10 to fluctuations in inlet flow rate or loading, since the liquid non-saturated region within the polishing zone 16 may be maintained in at least some locations along its length.

Referring to FIGS. 2, 5, 7 and 9, the initial treatment zone 14 and the polishing zone 16 are filled with filtering materials 36 and 46 respectively. In a preferred aspect of the system 10, these filtering materials 36, 46 are the same. In another preferred aspect of the system 10, the polishing zone 16 and the initial treatment zone 14 constitute a single packed mass, which may be composed of a single type of particulate filtering material. This facilitates installation of the system 10, by simply filling a dug hole that has been properly graded, with a single type of filtering material before providing the aeration zone and covering soil-like material on top.

It should nevertheless be understood that the filtering materials 36 and 46 may be different in granulometry, pore size, material nature, and other factors. Preferably, however, the filtering materials 36,46 have the same coarseness. In some cases, a greater coarseness can be used for filtering material 36 to reduce the chance of clogging.

Each of the filtering materials 36,46 may be isotropic or anisotropic, or a combination thereof. The filtering materials 36,46 may have internal and external pores to maximize the static liquid hold-up ($\epsilon_L^s$) as described in the United States and Canadian patent Nos. 6,602,407 and 2,410,541 respectively. By providing internally porous particles, at least two different levels of porosity can be achieved: first, the internal pores in the particles and second, the pores between each particle. These two kinds of pores, internal and external, may enable a greater static liquid hold-up in the internal pores and a greater dynamic liquid hold-up in the external pores, to thereby improve treatment efficiency.

In another preferred aspect of the system, the filtering material 36, 46 is the same and includes particles having an effective diameter of at least about 0.15 and a uniformity coefficient of at least about 2.5.

In another preferred aspect of the system, the particles of the filtering material 36, 46 have an effective diameter of at most about 0.5 and a uniformity coefficient of at most about 5.

In another preferred aspect of the system, the particles of the filtering material have an effective diameter of about 0.2 to about 0.3 and a uniformity coefficient of about 3.2 to about 3.7.

The filtering materials 36, 46 may be sand, which may be coarse or fine sand or a mixture thereof. Sand provides pore sizes to enable the upward capillary dispersion of the liquid, aerobic accommodation of the microflora and infiltration of air, while being a readily available and reasonably cost-effective material.

The filtering materials 36, 46 may also include an active substance suitable for retaining other pollutants such as phosphates and/or nitrogen compounds. These substances may be naturally occurring in the filtering materials or may be provided as a coating or additive on or in the filtering materials. For instance, there may be iron- and/or aluminium-based substances for removing phosphates. Also, the aeration may improve the efficiency of such active substances.

Referring still to FIGS. 2, 5, 7 and 9, the aeration zone 18 may be composed of a coarse packing material 62 coarser than the filtering material 46 of the polishing zone 16. In a preferred aspect of the system, the coarse packing material 62 is gravel, which may vary from coarse to fine gravel. Gravel provides interstitial channels to facilitate the flow of air from the atmosphere through the aeration zone 18 and into the polishing zone 16, while being a readily available and reasonably cost-effective material. In addition, during installation, gravel may be easily poured on top of the polishing zone 16 to cover the desired area to thereby create the interface 48 therebetween. The gravel may then be covered with soil or the like to render it subterranean.

In one preferred aspect of the system 10, the aeration zone 18 and the upper gas-saturated region (54 in FIG. 3) have together a total gas hold-up ($\epsilon_g^s + \epsilon_g^d$) corresponding to 1 m$^3$ or more to ensure the oxygenation level required for treating wastewater from a single family residence. This minimum volume is preferred when the secondary effluent to be treated has significant flow rate fluctuations and high concentrations of pollutants corresponding to those observed with a classic aerobic treatment unit (ATU).

Referring to FIG. 5, the first portion 56 of the aeration zone 18 may have a depth of about 20 cm gravel and the initial treatment zone 14 thereunder may have a depth of about 30 cm of sand.

Referring to FIG. 2, in particular when particulate materials are used, such as gravel for the aeration zone's coarse packing material 62 and sand for the filtering materials 36, 46, a covering 64 is provided above the initial treatment zone 14, the aeration zone 18 and the polishing zone 16, to stop infiltration of water and fine particles (water-impermeable membrane) or just fine particles (geotextile), beneath the covering. This prevents soil used to bury the initial treatment 14, polishing 16 and aeration 18 zones from infiltrating into the pores between the gravel and the sand, which would clog the zones and decrease the efficiency of the system 10.

For instance, excessive precipitation could hamper the aeration capacity and reduce the overall disinfection. Such infiltrating precipitation could also cause the desorption or breaking off of pathogenic micro-organisms retained on the filtering material 36, 46, particularly the viruses.

The aeration zone 18 may also be constructed by using hollow bodies in fluid communication with the polishing zone 16. The hollow bodies may be perforated pipes or half pipes with their open ends facing downward. The air supply would be connected to the pipes and the air would flow into the polishing zone 16. With downward facing half pipes, a separate covering could be foregone with since the upper half of the pipe would act to shield the incoming air flow. Alternatively, an infiltration chamber may be provided on top of or embedded in the polishing zone 16.

In a preferred aspect of the system 10, the initial treatment zone 14 has a plan-view surface area sized to allow a hydraulic loading rate lower than about 700 L/m2/day. A secondary liquid effluent 12 of high quality (e.g. fecal coliforms below 25000 CFU/100 mL, SS and DBO$_5$ below 10 mg/L) may be fed at a hydraulic loading rate may attain 700 L/m$^2$/day, while maintaining a reduced amount of clogging and a sufficiently long retention time. A secondary liquid effluent 12 of lower quality (e.g. fecal coliforms below 200000 counts/100 mL, SS and DBO$_5$ below 30 mg/L) is preferably provided at a reduced hydraulic loading rate to maintain aerobic functioning of the system with little or no maintenance. Of course, the hydraulic loading rate may be modified depending on the effective diameter and uniformity coefficient of the filtering materials 36, 46 as well as the dimensions of the initial treatment 14, polishing 16 and aeration 18 zones.

Given that the initial treatment zone 14, the polishing zone 16 and the aeration zone 18 are subterranean, the hydraulic loading rate should be applied to avoid excessive clogging phenomena to reduce or eliminate the need for maintenance. Clogging phenomena are associated with the development of a biofilm ($\epsilon_s^b$) around the filtering material 36, 46 ($\epsilon_s^m$) and with the particulate material ($\epsilon_s^P$) present in the effluent liquid 12. In addition, one should consider that a hydraulic loading rate that is too great can increase the total liquid hold-up ($\epsilon_L$) and decrease the total gas hold-up ($\epsilon_g$). It should also be noted that the gas hold-up ($\epsilon_g$) ensures the aeration of the filtering material and the development of a population of microflora for competing, consuming or otherwise removing pathogenic micro-organisms.

Referring to FIGS. 4, 6 and 8, in another preferred aspect of the system 10 the polishing zone 16 has a width W sized to allow a linear loading rate between about 100 L/m/day and about 350 L/m/day. Preferably, the linear loading rate is under about 300 L/m/day. Such linear loading rates allow the polishing zone 16 to be constructed in dimensions that are economical and feasible for individual and group domestic applications while enabling the desired disinfection.

In one preferred embodiment, the polishing zone 16 has a length between about 5 m and about 15 m and a depth between about 20 cm and about 50 cm. Still preferably, the length is about 10 m and the depth is about 30 cm.

It should be noted that the sizing of the system 10 is done according to the daily flow rates and the regulations in the given territory. The sizing may be adapted according to regulation changes. The linear loading rate and/or the polishing zone 16 lengths could also be modified depending on the level of disinfection required and the level of pollutants and pathogens present in the inlet secondary effluent.

Referring to FIG. 2, in another optional aspect of the tertiary system 10 there is a reservoir 66 containing a liquid and being in fluid communication with the second end of the polishing zone 16 and a circulation system 68 to recycle the liquid from the reservoir 66 to the inlet 26. This enables the treated liquid 20 to be recycled from the reservoir 66 to the inlet 26, so as to circulate liquid through the system during times of inoccupancy or low inlet flow rates or to recycle the treated liquid 20 for additional disinfection. The reservoir 66 may also be filled with water to be circulated to maintain liquid hold-up ($\epsilon_L^s + \epsilon_L^d$) and a level of humidity comfortable for the microflora, and to minimize the fluctuations in efficiency observed when restarting the system.

Referring to FIGS. 6-9, the system 10 can also include a sampling device 70 to test the effluent. There may be a sampling device at the outlet and/or near the inlet of the system 10.

Referring still to FIGS. 6-9, the system 10 preferably includes a collection system 72 at the second end of the polishing zone 16. The collection system 72 may include a perforated pipe 74 in a gravel trench (76 in FIGS. 7 and 9), the trench 76 being adjacent to and below the bottom floor 44 of the polishing zone 16 and being surrounded with geotextile. The collection system 72 assures treated effluent collection and discharge through an outlet pipe 78.

Various embodiments of the tertiary system 10 of the present invention, enable reduced or no maintenance, offer stable performance in variable conditions and also protect the area or medium receiving the treated wastewater. Some embodiments of the tertiary system may be installed as a permanent infrastructure if desired. In addition, the tertiary system 10 may be used to rehabilitate existing sites.

The tertiary disinfection process of the present invention includes various steps.

Referring to FIGS. 2, 5, 6 and 9, step a) includes percolating the liquid effluent 12 downward through the initial treatment zone 14 filled with the filtering material 36, to at least partially remove the remaining suspended solids, the dissolved organic pollutants and the pathogenic micro-organisms.

Step b) includes flowing the liquid effluent from the initial treatment zone horizontally through the subterranean polishing zone 16 interfacing with the initial treatment zone 14 and including its filtering material 46 having pore sizes allowing upward capillary dispersion of the liquid effluent 12. Preferably, the filtering materials 36,46 of the initial treatment and polishing zones are the same, and the initial treatment and polishing zones constitute a single packed mass enabling direct fluid flow and dispersion there-between.

Step c) includes aerating the initial treatment zone 14 and the polishing zone 16 to enable aerobic accommodation of the microflora therein for competing with, consuming, grazing, adhering to and/or breaking down the pathogenic micro-organisms, to thereby produce the treated effluent 20. Preferably, the aerating of the initial treatment zone and the polishing zone is done from above via a subterranean aeration zone 18.

The process may also have the step d) of recirculating a given liquid volume back into step a), to maintain the favourable hydrodynamic conditions in the system and/or re-treating the liquid 20 or a portion thereof.

In a preferred aspect of the process of the present invention, the steps a), b) and c) occur in the system 10 as described hereinabove.

Experimentation and Results

FIG. 3 illustrates observations made in cross-section of the polishing zone 16, in particular the lower liquid-saturated region 52, the liquid non-saturated region 50 and the upper gas-saturated region 54. This photograph was taken in a system that had been in operation for more than 33 months.

EXAMPLE

In the example of the tertiary disinfection system, the width of the initial treatment and polishing zones was 5 m and the total length of the system was 12 m, including 2 m for the initial treatment zone and 10 m for the polishing zone. The two zones were filled with sand as filtering material. The filtration sand had an effective diameter ($d_{10}$) of about 0.20 mm and a uniformity coefficient ($C_u$) of about 3.3. The depth of the sand making up the initial treatment and polishing zones was 30 cm. The aeration zone was composed of gravel and had a depth of 15 cm. The tertiary system installed downstream from a septic tank and a peat biofilter, such as that described in U.S. Pat. Nos. 5,618,414 and 5,206,206. The tertiary system treated secondary effluent from domestic wastewater. The average flow rate varied between 900 and 1200 L/day for a linear loading rate between 180 and 240 L/m/day. The hydraulic loading rate applied on the initial treatment zone was between 135 and 185 L/m$^2$/day.

Between 76 and 96 punctual samples were taken during three years at five different locations L1-L5 along the system. FIG. 6 shows the sample locations L1-L5.

The concentration of fecal coliforms was used as an indicator of the contamination observed at the locations L1-L5 of sampling. Table 1 summarizes the results of this example.

TABLEAU 1

Fecal Coliform Results for tertiary disinfection system

| Sample location | Description | Number of samples | Median (counts/100 mL) | Geometric Mean (counts/100 mL) | Total reduction (vs last sampling location) |
|---|---|---|---|---|---|
| L1 | Septic Tank Effluent | 95 | $1.41 \times 10^6$ | $1.29 \times 10^6$ | — |
| L2 | Peat Biofilter Effluent | 96 | $1.70 \times 10^4$ | $2.77 \times 10^4$ | 1.67 log |
| L3 | Inlet of FDI (well 1) | 96 | $1.70 \times 10^3$ | $2.66 \times 10^3$ | 2.69 log (1.02 log) |
| L4 | FDI 5 m long (well 2) | 87 | $1.20 \times 10^1$ | $5.57 \times 10^1$ | 4.36 log (1.67 log) |
| L5 | FDI 10 m long (well 3) | 76 | $1.00 \times 10^1$ | $1.79 \times 10^1$ | 4.86 log (0.5 log) |

NOTE:
Values that were less than the detection limit were reported as the limit for L4 and L5 (either 10 or 100 counts/100 mL).

The peat biofilter and the disinfection filter reduced fecal coliform counts. The peat biofilter removed 1.67 logs of fecal coliform, reducing counts from $1.3 \times 10^6$ to $2.8 \times 10^4$ counts/100 mL while the 300 mm layer of sand below the peat (L3) removed a further 1.0 logs of fecal coliform, reducing counts to $2.7 \times 10^3$ counts/100 mL. The first five meters of the disinfection filter removed a further 1.7 logs of fecal coliforms, reducing counts to 56 counts/100 mL and the second five meters of FDI, between L4 and L5, removed a final 0.5 logs of fecal coliforms, reducing counts from 56 to 18 counts/100 mL. These results indicate that the tertiary disinfection system achieved complete or near complete removal of fecal coliforms.

Of course, the illustrated embodiments and the detailed description show examples and preferred embodiments of the system and process of the present invention and should not limit what has actually been invented.

What is claimed is:

1. A system for treating a domestic liquid effluent, comprising:
   a domestic primary treatment unit, including:
   an inlet for receiving a liquid effluent from a domestic source comprising pathogenic micro-organisms and having a given TSS, $BOD_5$ and fecal coliform level,
   a treatment chamber in fluid communication with the inlet, adapted to reduce the TSS, $BOD_5$ and fecal coliform level of the liquid effluent, and
   an outlet in fluid communication with the treatment chamber for outflowing a primary liquid effluent comprising pathogenic micro-organisms and having a TSS approximately between 50 and 80 mg/l, a $BOD_5$ of approximately between 140 and 200 mg/l, and a fecal coliform level of about 1,000,000 CFU/100 ml;
   a domestic secondary treatment unit, including:
   an inlet in fluid communication with the outlet of the primary treatment unit for receiving the primary liquid effluent,
   a treatment chamber in fluid communication with the inlet, adapted to reduce the TSS, $BOD_5$ and fecal coliform level of the primary liquid effluent, and
   an outlet in fluid communication with the treatment chamber for outflowing a secondary liquid effluent comprising pathogenic micro-organisms and having a TSS between 10 and 30 mg/L, a $BOD_5$ between 10 and 30 mg/L, and a fecal coliform level between 25,000 and 200,000 CFU/100 ml; and
   a tertiary disinfection system, including:
   an inlet, in fluid communication with the outlet of the domestic secondary treatment unit, for receiving the secondary liquid effluent,
   a subterranean initial treatment zone filled with a filtering material for at least partially removing the remaining suspended solids, the dissolved organic pollutants and the pathogenic micro-organisms, the initial treatment zone having top and bottom sections, the top section being in fluid communication with the inlet for receiving and allowing the secondary liquid effluent to percolate downward toward the bottom section,
   a subterranean polishing zone extending horizontally outward from the initial treatment zone and having a length between about 5 m and about 15 m, and a depth between about 20 cm and about 50 cm, the polishing zone having a first end interfacing with the initial treatment zone for receiving the liquid effluent therefrom and a second end opposite to the first end for outflowing a treated effluent having an SS and $BOD_5$ below 10 mg/L and a coliform level below 200 CFU/100 mL, the polishing zone further having a bottom floor sloping downhill from the first end toward the second end and being filled with a filtering material having pore sizes allowing upward capillary dispersion of the liquid effluent flowing from the first end toward the second end,
   a subterranean aeration zone having an interface with the initial treatment zone and the polishing zone, the interface being sized so as to provide aeration enabling the initial treatment zone and the polishing zone to aerobically accommodate microflora for competing with, consuming, grazing, adhering to and/or breaking down the pathogenic micro-organisms, and thereby produce the treated effluent at the second end of the polishing zone, the aeration zone including a coarse packing material coarser than the filtering material of the polishing zone, or hollow bodies in fluid communication with the polishing zone, or a combination thereof, and
   a covering, arranged above the initial treatment zone, the aeration zone and the polishing zone, to stop infiltration of water or fine particles, or both, beneath the covering, and to maintain conditions for treating the liquid effluent.

2. The system of claim 1, wherein the aeration zone comprises a first portion over the top section of the initial treatment zone.

3. The system of claim 2, wherein the aeration zone comprises a second portion above the polishing zone extending from the first end to the second end thereof.

4. The system of claim 3, wherein the first portion of the aeration zone has an air inlet in fluid communication with the atmosphere.

5. The system of claim 1, wherein the initial treatment zone has a plan-view surface area sized to allow a hydraulic load rate lower than about 700 L/m2/day.

6. The system of claim 5, wherein the polishing zone has a width sized to allow a linear loading rate between about 100 L/m/day and about 350 L/m/day.

7. The system of claim 6, wherein the length is about 10 m and the depth is about 30 cm.

8. The system of claim 6, wherein the polishing zone further comprises an upper gas-saturated region in contact with the aeration zone and the aeration zone is sized to allow a total air hold-up within the aeration zone and the upper gas-saturated region of at least about 1 $m^3$.

9. The system of claim 1, wherein the bottom floor has a downhill slope toward the second end from about 2% to about 8% grade.

10. The system of claim 9, wherein the bottom floor comprises an impermeable membrane.

11. The system of claim 1, wherein the coarse packing material is gravel.

12. The system of claim 1, wherein the hollow bodies comprise perforated pipes, half pipes or infiltration chamber, or a combination thereof.

13. The system of claim 1, wherein the filtering material of the initial treatment zone is the same as the filtering material of the polishing zone, and the polishing zone with the initial treatment zone constitute a single packed mass.

14. The system of claim 13, wherein the filtering material comprises particles having an effective diameter of at least about 0.15 mm and a uniformity coefficient of at least about 2.5.

15. The system of claim 14, wherein the particles of the filtering material have an effective diameter of at most about 0.5 mm and a uniformity coefficient of at most about 5.

16. The system of claim 15, wherein the particles of the filtering material have an effective diameter of about 0.2 to about 0.3 mm and a uniformity coefficient of about 3.2 to about 3.7.

17. The system of claim 15, wherein the filtering material comprises sand.

18. The system of claim 13, wherein the filtering material comprises an internally porous material, internally porous particles, or sand, or a combination thereof.

19. The system of claim 1, wherein the filtering material of the polishing zone and/or the initial treatment zone comprises an active substance suitable for retaining phosphates and/or nitrogen compounds.

20. The system of claim 1, wherein the inlet comprises a distributor arranged above the initial treatment zone for evenly distributing the liquid effluent onto the initial treatment zone.

21. The system of claim 1, further comprising
a reservoir containing a liquid and being in fluid communication with the second end of the polishing zone, and
a circulation system to recycle the liquid from the reservoir to the inlet.

22. A process for treating a liquid effluent from a domestic source, the liquid effluent including pathogenic micro-organisms and having a given TSS, $BOD_5$ and fecal coliform level, the process comprising the steps of:
reducing the TSS, $BOD_5$ and fecal coliform level of the liquid effluent in a primary treatment unit and outflowing a primary liquid effluent comprising pathogenic micro-organisms and having a TSS approximately between 50 and 80 mg/l, a $BOD_5$ approximately between 140 and 200 mg/l, and a fecal coliform level of about 1,000,000 CFU/100 ml;
reducing the TSS, $BOD_5$ and coliform level of the primary liquid effluent in a secondary treatment unit and outflowing a secondary liquid effluent comprising pathogenic micro-organisms and outflowing a secondary liquid effluent comprising pathogenic micro-organisms and having a TSS between 10 and 30 mg/L a $BOD_5$ between 15 and 30 mg/L and a fecal coliform level between 25,000 and 200,000 CFU/100 ml;
disinfecting the secondary liquid effluent comprising the steps of providing a tertiary disinfection system comprising:
an inlet in fluid communication with an outlet of the domestic secondary treatment unit for receiving the secondary liquid effluent;
a subterranean initial treatment zone filled with a filtering material for at least partially removing the remaining suspended solids, the dissolved organic pollutants and the pathogenic micro-organisms, the initial treatment zone having top and bottom sections, the top section being in fluid communication with the inlet for receiving and allowing the liquid effluent to percolate downward toward the bottom section;
a subterranean polishing zone extending horizontally outward from the initial treatment zone and having a length between about 5 m and about 15 m, and a depth between about 20 cm and about 50 cm, the polishing zone having a first end interfacing with the initial treatment zone for receiving the liquid effluent therefrom and a second end opposite to the first end for outflowinq a treated effluent haying a TSS and $BOD_5$ below 5 mg/L, and a coliform level below 200 CFU/100 mL, the polishing zone further having a bottom floor sloping downhill from the first end toward the second end and being filled with a filtering material having pore sizes allowing upward capillary dispersion of the liquid effluent flowing from the first end toward the second end;
a subterranean aeration zone having an interface with the initial treatment zone and the polishing zone, the interface being sized so as to provide aeration enabling the initial treatment zone and the polishing zone to aerobically accommodate microflora for competing with, consuming, grazing, adhering to and/or breaking down the pathogenic micro-organisms, and thereby produce the treated effluent at the second end of the polishing zone, the aeration zone being composed of a coarse packing material coarser than the filtering material of the polishing zone, or hollow bodies in fluid communication with the polishing zone or a combination thereof, and
a covering arranged above the initial treatment zone, the aeration zone and the polishing zone, chosen so as to stop infiltration of water or fine particles, or both, beneath the covering and maintain conditions for treating the liquid effluent
percolating the secondary liquid effluent downward through the subterranean initial treatment zone to at least partially remove the remaining suspended solids, the dissolved organic pollutants and the pathogenic micro-organisms;
flowing the liquid effluent from the initial treatment zone horizontally through the subterranean polishing zone; and
aerating the initial treatment zone and the polishing zone to enable aerobical accommodation of microflora therein for competing with, consuming, grazing, adhering to and/or breaking down the pathogenic micro-organisms, to thereby produce a treated effluent having an SS and $BOD_5$ below 10 mg/L, and a coliform level below 200 CFU/100 mL.

23. The process of claim 22, wherein the filtering material of the initial treatment zone is the same as the filtering material of the polishing zone, and the polishing zone with the initial treatment zone constitute a single packed mass enabling direct fluid flow there-between.

24. The process of claim 23, wherein said percolating step further comprises allowing radial capillary dispersion of the liquid effluent toward the polishing zone.

25. The process of claim 23, wherein the filtering material comprises particles having an effective diameter of at least about 0.15 mm and a uniformity coefficient of at least about 2.5.

26. The process of claim 25, wherein the particles of the filtering material have an effective diameter of at most about 0.5 mm and a uniformity coefficient of at most about 5.

27. The process of claim 26, wherein the particles of the filtering material have an effective diameter of about 0.2 to about 0.3 mm and a uniformity coefficient of about 3.2 to about 3.7.

28. The process of claim 26, wherein the packing material comprises sand.

29. The process of claim 22, further comprising circulating a liquid solution or a portion of the treated liquid back into said percolating step.

* * * * *